US007002262B2

(12) United States Patent
Miyata et al.

(10) Patent No.: US 7,002,262 B2
(45) Date of Patent: Feb. 21, 2006

(54) ACTIVATION CONTROL APPARATUS AND METHOD OF AIR BAG SYSTEM

(75) Inventors: Yujiro Miyata, Toyota (JP); Tomoki Nagao, Nagoya (JP); Katsuji Imai, Nagoya (JP); Motomi Iyoda, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 346 days.

(21) Appl. No.: 10/332,856

(22) PCT Filed: Aug. 1, 2001

(86) PCT No.: PCT/IB01/01373

§ 371 (c)(1), (2), (4) Date: May 9, 2003

(87) PCT Pub. No.: WO02/09982

PCT Pub. Date: Feb. 7, 2002

(65) Prior Publication Data

US 2003/0178826 A1 Sep. 25, 2003

(30) Foreign Application Priority Data

Aug. 2, 2000 (JP) ............................ 2000-234841

(51) Int. Cl.
*B60L 1/00* (2006.01)

(52) U.S. Cl. ........................................ 307/9.1; 280/735

(58) Field of Classification Search ................. 307/9.1; 280/735; 340/436; 701/45
See application file for complete search history.

(56) References Cited

U.S. PATENT DOCUMENTS

| | | | | |
|---|---|---|---|---|
| 4,565,919 | A | 1/1986 | Bitter et al. | 219/509 |
| 6,353,782 | B1 * | 3/2002 | Kunimi et al. | 701/45 |
| EP 0 089 088 | A1 | 9/1983 | | |

FOREIGN PATENT DOCUMENTS

| | | | |
|---|---|---|---|
| DE | 38 11 217 | | 10/1989 |
| DE | 40 05 598 | A1 | 8/1991 |
| DE | 198 16 989 | | 11/1999 |

(Continued)

*Primary Examiner*—Phuong T. Vu
*Assistant Examiner*—Luis Roman
(74) *Attorney, Agent, or Firm*—Kenyon & Kenyon

(57) ABSTRACT

An activation control apparatus of an air bag system of a motor vehicle includes a first sensor disposed at a predetermined position within a vehicle body, for generating a signal indicative of an impact applied to the vehicle, and at least one second sensor disposed frontwardly of the position of the first sensor, for generating a signal indicative of an impact applied to the vehicle. The control apparatus is operable to activate an air bag device when a parameter determined based on the output signal of the first sensor exceeds a predetermined threshold pattern that is determined based on the output signal of the second sensor. When the predetermined threshold pattern is changed from a reference pattern to a desired threshold pattern that provides lower threshold values, the pattern is changed step by step at predetermined time intervals, without skipping an intermediate pattern or patterns between the reference pattern and the desired pattern.

32 Claims, 6 Drawing Sheets

FOREIGN PATENT DOCUMENTS

| | | | |
|---|---|---|---|
| EP | 0 402 027 | A1 | 12/1990 |
| EP | 0 818 357 | A2 | 1/1998 |
| GB | 2 304 540 | A | 3/1997 |
| JP | 10-152014 | | 6/1998 |
| JP | 11-286257 | | 10/1999 |
| WO | WO 86/05149 | | 9/1986 |
| WO | WO 93/21043 | | 10/1993 |
| WO | WO 94/14638 | | 7/1994 |
| WO | WO 94/22693 | | 10/1994 |
| WO | WO 96/19363 | | 6/1996 |
| WO | WO97/48582 | | 12/1997 |

* cited by examiner

ACTIVATION CONTROL APPARATUS AND METHOD OF AIR BAG SYSTEM

BACKGROUND OF THE INVENTION

1. Field of the Invention

The invention relates generally to activation control apparatus and method of an air bag system of a motor vehicle, and in particular to such an air-bag activation control apparatus that is arranged to activate an air bag device in an appropriate situation so as to protect an occupant upon collision of the vehicle with an object.

2. Description of Related Art

One type of an activation control apparatus of an air bag system as disclosed in Japanese laid-open Patent Publication (Kokai) No. 11-286257 has been known in the art. The activation control apparatus of this type includes a floor sensor that is disposed in a floor tunnel of the vehicle body and is adapted to generate a signal indicative of an impact applied to the vehicle floor portion at which the sensor is located. When a parameter determined based on the output signal of the floor sensor exceeds a threshold value, the activation control apparatus operates to activate an air bag device so as to deploy or inflate an air bag. The apparatus further includes satellite sensors that are disposed in a front portion of the vehicle body and is adapted to generate signals indicative of an impact that is applied to the vehicle front portion in which the sensors are located. The above-indicated threshold value is reduced by an amount that increases with an increase in the impact that is applied to the front portion of the vehicle body and is determined based on the output signals of the satellite sensors. With the threshold value thus reduced, the air bag is made more likely to deploy as the magnitude of the impact applied to the front portion of the vehicle body increases. With the above-described known apparatus, therefore, the air bag device for protecting a vehicle occupant can be activated at an appropriate time or in an appropriate situation.

In the known air-bag activation control apparatus as described above, the amount of reduction of the threshold value serving as a criterion for deployment of the air bag is increased with an increase in the magnitude of an impact that is applied to the vehicle front portion and is determined based on the output signals of the satellite sensors. If the reduction of the threshold value to a desired value is accomplished in one step with no regard to a difference between the threshold value and the desired value, namely, with no regard to the magnitude of the impact applied to the vehicle front portion, the likelihood that the air bag will deploy increases by a large degree at a time. This may happen even in the case where it is determined that a great impact is applied to the vehicle front portion, actually because of an abnormality or defect in the satellite sensors, or the like. In such a case, the air bag may deploy by mistake. In order to cause the air bag to deploy at an appropriate time, therefore, it is considered inappropriate or undesirable to reduce the threshold value to the desired value in one step or at a time. In the known apparatus, however, no special measure has been taken for switching or reducing the threshold value to a desired value without causing erroneous deployment of the air bag.

SUMMARY OF THE INVENTION

It is therefore an object of the invention to provide an activation control apparatus of an air bag system, which is able to activate an air bag system at an appropriate time or in an appropriate situation, by switching a threshold value as a criterion for deployment of an air bag to a desired value step by step. It is another object of the invention to provide a method for controlling activation of an air bag device of an air bag system.

To accomplish the above object and/or other object(s), one aspect of the invention provides1 an activation control apparatus of an air bag system of a motor vehicle, which comprises: (a) a first sensor that is disposed at a predetermined position within a vehicle body, and is operable to generate an output signal indicative of an impact applied to the vehicle, (b) activation control means for activating an air bag device when a parameter determined based on the output signal of the first sensor exceeds a predetermined threshold value, (c) a second sensor that is disposed in the vehicle body frontwardly of the predetermined position of the first sensor, and is operable to generate an output signal indicative of an impact applied to the vehicle, (d) threshold setting means for setting the predetermined threshold value to a first value selected from at least three candidate values, based on the output signal of the second sensor, and (e) threshold switching means for changing the predetermined threshold value from the first value to a second value also selected from the at least three candidate values, by performing two or more switching operations to switch the predetermined threshold value step by step at predetermined time intervals when at least one of the at least three candidate values is present between the first value and the second value.

In the activation control apparatus constructed as described above, when the predetermine threshold value that has been set to a certain value is changed or updated to a desired value, the predetermined threshold value is switched from the current value to the desired value step by step at predetermined time intervals when at least one of the three or more candidate values is present between the current value and the desired value. In this case, the predetermined threshold value is prevented from switching from the current value to the desired value at a time while jumping an intermediate value(s). Therefore, even if the predetermined threshold value greatly changes due to, for example, an abnormality or a defect in the second sensor, the above arrangement can avoid a situation that the air bag device is suddenly made much easier to activate, or a situation that the air bag device is suddenly made much difficult to activate. Consequently, the air bag device is prevented from being activated by mistake. Thus, according to the invention, the air bag device can be activated in an appropriate situation.

According to another aspect of the invention, there is provided an activation control apparatus of an air bag system of a motor vehicle, which comprises: (a) a first sensor that is disposed at a predetermined position within a vehicle body, and is operable to generate an output signal indicative of an impact applied to the vehicle, (b) activation control means for activating an air bag device when a parameter determined based on the output signal of the first sensor exceeds a predetermined threshold pattern, (c) a second sensor that is disposed in the vehicle body frontwardly of the predetermined position of the first sensor, and is operable to generate an output signal indicative of an impact applied to the vehicle, (d) threshold pattern setting means for setting the predetermined threshold pattern to a first pattern selected from at least three candidate patterns, based on the output signal of the second sensor, and (e) threshold pattern switching means for changing the predetermined threshold pattern from the first pattern to a second pattern also selected from the at least three candidate patterns, by performing two or more switching operations to switch the predetermined threshold pattern step by step at predetermined time intervals when at least one of the at least three candidate patterns is present between the first pattern and the second pattern.

In the activation control apparatus constructed as described above, when the predetermine threshold pattern that has been set to a certain pattern is changed or updated to a desired pattern, the predetermined threshold pattern is switched from the current pattern to the desired pattern step by step at predetermined time intervals when at least one of the three or more candidate patterns is present between the current pattern and the desired pattern. In this case, the predetermined threshold pattern is prevented from switching from the current pattern to the desired pattern at a time while jumping an intermediate pattern(s). Therefore, even if the predetermined threshold pattern greatly changes due to, for example, an abnormality or a defect in the second sensor, the above arrangement can avoid a situation that the air bag device is suddenly made much easier to activate, or a situation that the air bag device is suddenly made much difficult to activate. Consequently, the air bag device is prevented from being activated by mistake. Thus, according to the invention, the air bag device can be activated in an appropriate situation.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION

Figure 1:
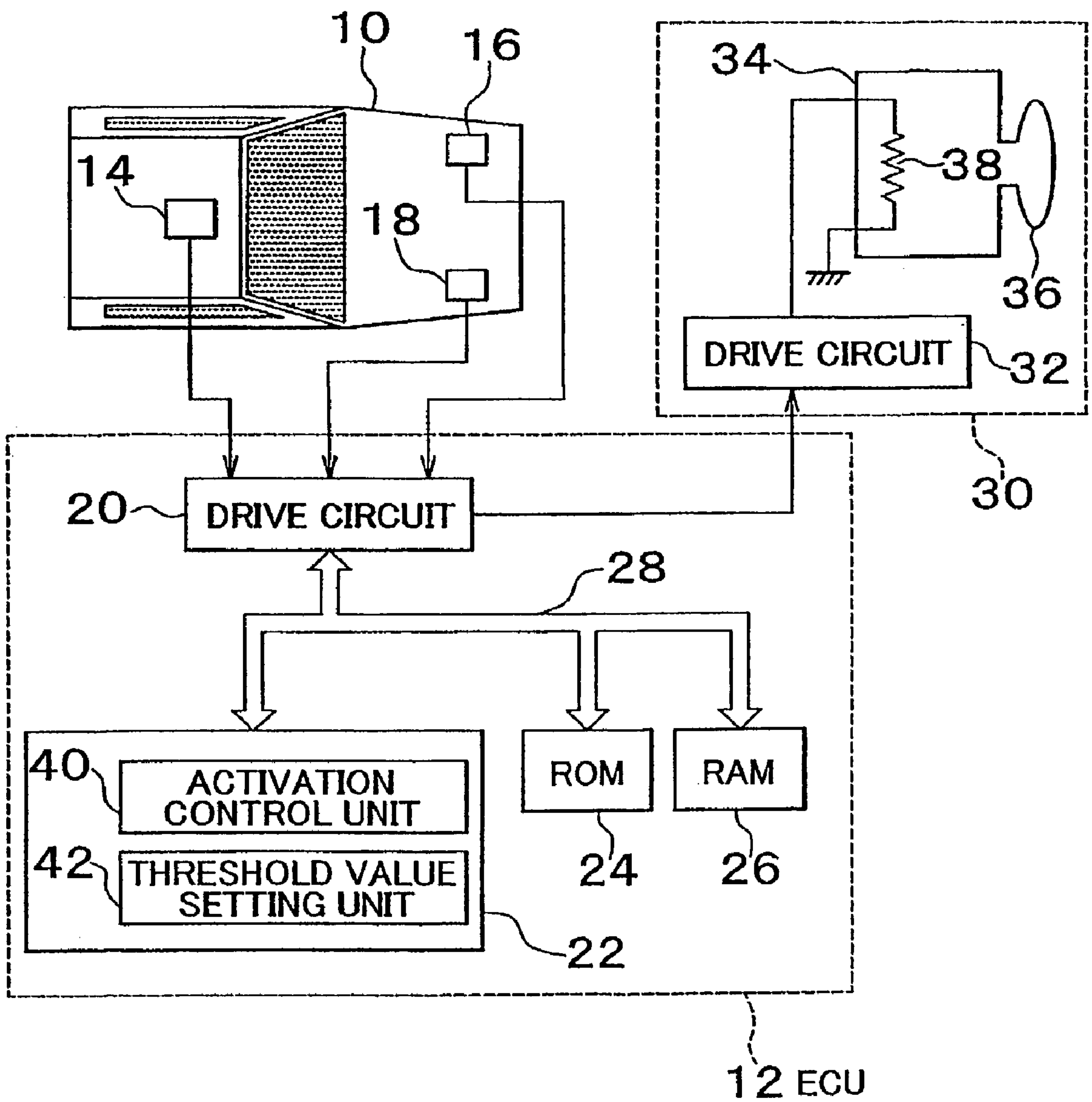
FIG. 1 is a view showing the arrangement of an air bag system that employs an activation control apparatus according to a preferred embodiment of the invention.

FIG. 1 shows the arrangement of an air bag system that employs an activation control apparatus according to a preferred embodiment of the invention. The system of this embodiment includes an electronic control unit (hereinafter referred to as "ECU") 12 that is installed on a vehicle 10, such as an automobile. The air bag system and its activation control apparatus are controlled by the ECU 12.

The activation control apparatus of this embodiment includes a floor sensor 14 and a pair of satellite sensors 16, 18 that are installed on the vehicle 10. The floor sensor 14 is disposed in the vicinity of a floor tunnel located in a central portion of the vehicle body, while the satellite sensors 16, 18 are disposed on right and left side members, respectively, in a front portion of the vehicle body. Each of the floor sensor 14 and satellite sensors 16, 18 consists of an electronic deceleration sensor that generates a signal indicative of the magnitude of an impact that is applied in a running direction of the vehicle to a relevant portion of the vehicle body at which the sensor is located. More specifically, the output signal of each sensor represents a deceleration that is experienced by the relevant portion of the vehicle body. Each of the floor sensor 14 and satellite sensors 16, 18 also has a self-diagnosis function, and is adapted to generate a certain signal to the outside when the sensor 14, 16, 18 detects an abnormality or a defect in itself.

The ECU 12 includes an input/output circuit 20, a central processing unit (hereinafter referred to as "CPU") 22, a read-only memory (hereinafter referred to as "ROM") 24, a random access memory (hereinafter referred to as "RAM") 26 used as a work area, and a bidirectional bus 28 through which the components 20, 22, 24, 26 are connected to each other. The ROM 24 stores in advance various processing programs and tables needed for operations or calculations.

The floor sensor 14 and satellite sensors 16, 18 as described above are connected to the input/output circuit 20 of the ECU 12. The output signal of the floor sensor 14 and the output signals of the satellite sensors 16, 18 are supplied to the input/output circuit 20, and are stored in the RAM 26 as needed in accordance with a command received from the CPU 22. The ECU 12 determines a deceleration Gf of the central portion of the vehicle body, based on the output signal of the floor sensor 14. Also, the ECU 12 determines decelerations $G_{SL}$, $G_{SR}$ of the front left portion and front right portion, respectively, of the vehicle body, based on the output signals of the satellite sensors 16, 18. Furthermore, the ECU 12 determines whether each sensor is in an abnormal operating condition, based on an output signal that is generated in accordance with the result of self diagnosis by the sensor.

The system of FIG. 1 further includes an air bag device 30 that is installed on the vehicle 10 and is activated when appropriate so as to protect an occupant in a passenger compartment of the vehicle 10. The air bag device 30 includes a drive circuit 32, an inflator 34, and an air bag 36. The inflator 34 incorporates a firing device 38 connected to the drive circuit 32, and a gas generator (not shown) that generates a large quantity of gas when it is heated by the firing device 38. The gas generated by the inflator 34 is used for deploying or inflating the air bag 36. The air bag 36 is installed in position so that the deployed air bag is located between the occupant of the vehicle 10 and a component (such as a steering wheel) installed on the vehicle.

The drive circuit 32 of the air bag device 30 is connected to the input/output circuit of the ECU 12. When a drive signal is supplied from the input/output circuit 20 to the drive circuit 32, the air bag device 30 is activated, and deployment of the air bag 36 is initiated. The CPU 22 of the ECU 12 includes an activation control unit 40 and a threshold setting unit 42. The activation control unit 40 of the CPU 22 calculates a parameter based on a deceleration Gf detected by means of the floor sensor 14, according to a processing program stored in the ROM 24, and determines whether the parameter thus obtained exceeds a predetermined threshold value. The activation control unit 40 then controls supply of a drive signal from the input/output circuit 20 to the drive circuit 32 of the air bag device 30, based on the result of the above determination as to whether the parameter exceeds the predetermined value. The threshold setting unit 42 suitably sets the above-indicated predetermined threshold value to be used by the activation control unit 40, based on decelerations $G_{SL}$, $G_{SR}$ determined based on the output signals of the satellite sensors 16, 18, respectively.

Next, a control operation performed by the CPU 22 of the present embodiment will be described in detail.

Figure 2:
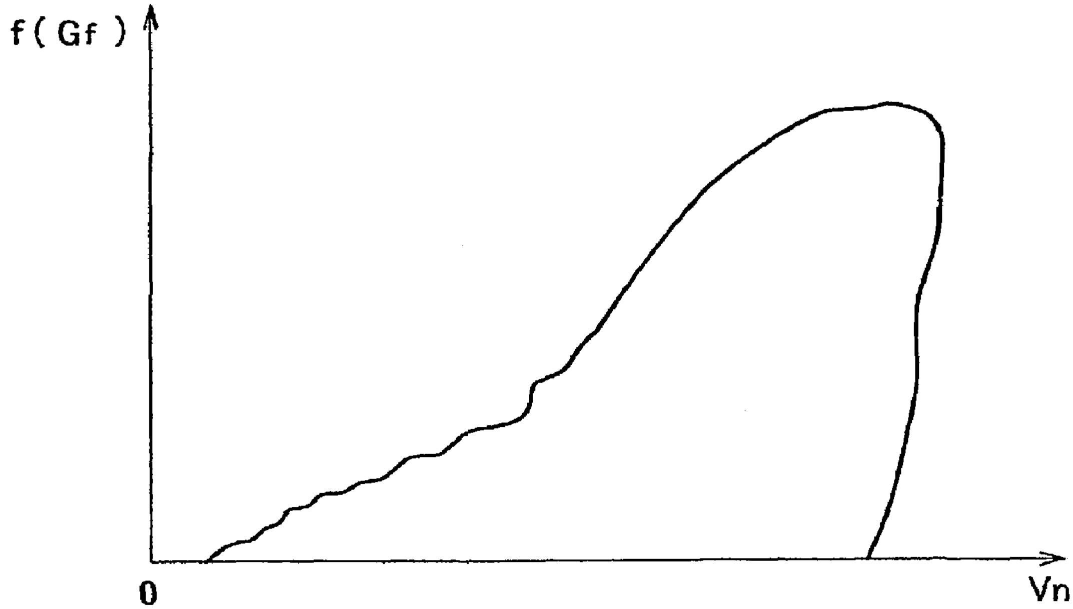
FIG. 2 is a graph indicating the relationship between velocity Vn and calculated value f(Gf) that is plotted for each predetermined time under certain conditions.

In this embodiment, the activation control unit 40 obtains a calculated value f(Gf) and a velocity Vn by performing predetermined operations on a deceleration Gf determined based on the output signal of the floor sensor 14. More specifically, the velocity Vn is obtained by integrating the deceleration Gf with respect to time. Namely, since an object (e.g., an occupant) in a passenger compartment of the vehicle is accelerated forward relative to the vehicle body due to inertial force when the vehicle 10 undergoes a deceleration Gf during running, the velocity Vn of the object relative to the vehicle can be obtained by integrating the deceleration Gf with respect to time. The calculated value f(Gf) may be equal to the deceleration Gf itself, or may be obtained by integrating the deceleration Gf with respect to unit time. FIG. 2 is a graph indicating the relationship between the calculated value f(Gf) and the velocity Vn, which relationship is plotted for each predetermined time under certain conditions. After obtaining the calculated value f(Gf) and the velocity Vn, the activation control unit 40 compares a value determined from the relationship between these values f(Gf) and Vn, with a threshold value SH that is set by the threshold setting unit 42 and provides a determination map as described later.

Figure 3:
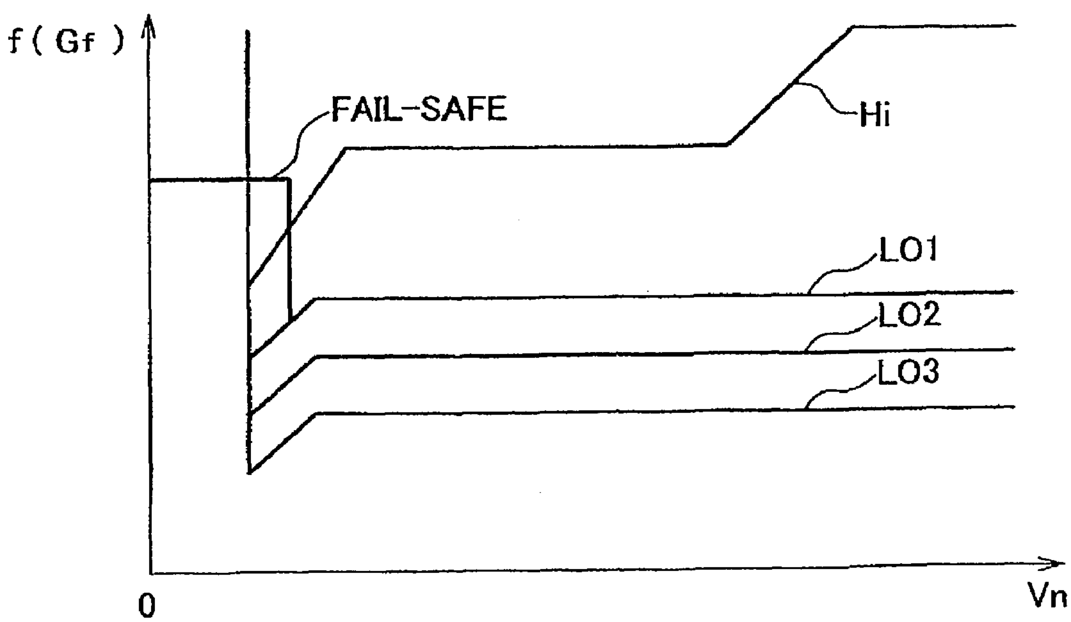
FIG. 3 is a graph showing variation patterns of variations of threshold value SH, which patterns serve as determination maps, which are plotted in relation to the calculated value f(Gf) and the velocity Vn.
Figure 4:
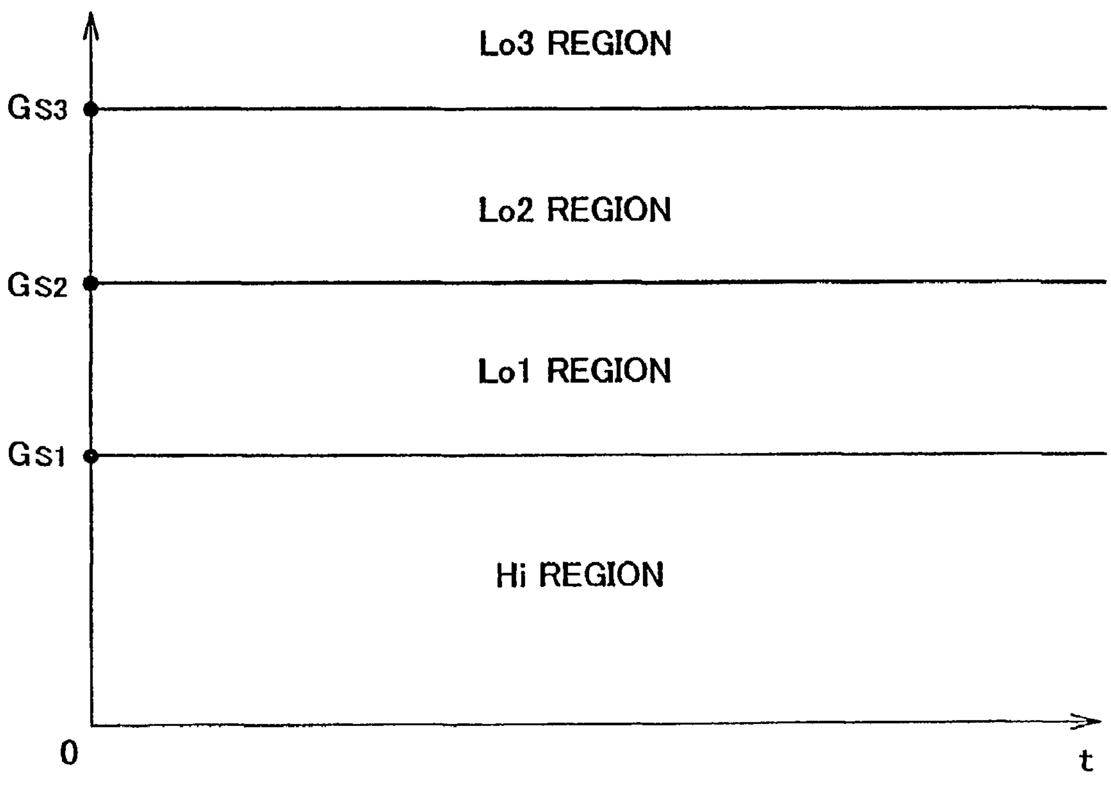
FIG. 4 is a graph useful for explaining the manner of setting threshold variation patterns according to the preferred embodiment.

FIG. 3 indicates patterns of variations in the threshold value SH (hereinafter referred to as "threshold variation patterns"), which function as determination maps of threshold values plotted against the calculated value f(Gf) and the velocity Vn. In FIG. 3, five patterns, namely, Hi MAP, Lo1 MAP, Lo2 MAP, Lo3 MAP and FAIL-SAFE MAP, are provided as threshold variation patterns. In this embodiment, the Hi MAP is a reference map based on which the threshold value SH is normally determined, and the FAIL-SAFE MAP overlaps Lo1 MAP. Referring next to FIG. 4, a method of setting a threshold variation pattern according to this embodiment will be explained.

In the present embodiment, the threshold setting unit 42 stores in advance the threshold variation patterns that were empirically determined in relation to the calculated value f(Gf) and the velocity Vn as shown in FIG. 3. These threshold variation patterns represent boundaries between a region in which the air bag device 30 needs to be activated in response to an impact applied to the vehicle 10, and a region in which the air bag device 30 does not need to be activated.

Since the possibility of collision of the vehicle 10 is higher as an impact acting on a front portion of the vehicle body is greater, it is appropriate to select a suitable one of the above threshold variation patterns upon receipt of a great impact, so as to make the air bag device 30 more likely to be activated. In this embodiment, therefore, the threshold setting unit 42 selects a threshold variation pattern from the above five patterns, so that the threshold value SH determined according to the pattern decreases with an increase in the decelerations $G_{SL}$, $G_{SR}$ determined based on the output signals of the satellite sensors 16, 18. More specifically described referring to FIG. 4, the Hi MAP is selected as the threshold variation pattern when a larger one of the decelerations $G_{SL}$, $G_{SR}$ is smaller than a first predetermined value $G_{S1}$. The larger one of the decelerations $G_{SL}$, $G_{SR}$ will be denoted as "deceleration $G_S$". The Lo1 MAP is selected when the deceleration $G_S$ is equal to or larger than the first predetermined value $G_{S1}$ but is smaller than a second predetermined value $G_{S2}$, and the Lo2 MAP is selected when the deceleration $G_S$ is equal to or larger than the second predetermined value $G_{S2}$ but is smaller than a third predetermined value $G_{S3}$. The Lo3 MAP is selected when the deceleration $G_S$ is equal to or larger than the third predetermined value $G_{S3}$.

In the activation control apparatus constructed as described above, the activation control unit 40 compares the value determined in relation to the calculated value f(Gf and the velocity Vn, with the threshold value SH on the threshold variation pattern that is currently selected and set by the threshold setting unit 40. If the value defined by the calculated value f(Gf) and the velocity Vn is greater than the threshold value SH, a drive signal is supplied from the input/output circuit 20 to the drive circuit 32 of the air bag device 30. In this case, the air bag device 30 is activated, to initiate deployment of the air bag 36.

According to the present embodiment, therefore, the activation control apparatus is able to perform suitable activation control depending upon the type of collision of the vehicle 10, such as a head-on collision, offset collision or an oblique impact, by changing a threshold value for activating the air bag device 30 depending upon an impact applied to a front portion of the vehicle body. More specifically, the air bag device 30 is more likely to be activated as the magnitude of an impact applied to the vehicle front portion increases. This make it possible to activate the air bag device 30 at an appropriate time in an appropriate situation.

In some cases, even if only a small impact is applied to a front portion of the vehicle body, the decelerations $G_{SL}$, $G_{SR}$ determined based on the output signals of the satellite sensors 16, 18 may be large because of, for example, an abnormality in the satellite sensors 16, 18, or an abnormality in communications between the satellite sensors 16, 18 and the ECU 12, or the Like. In such cases, the deceleration $G_S$, which is the larger one of the decelerations $G_{SL}$, $G_{SR}$, may change at a time from a value that is smaller than the first predetermined value $G_{S1}$, up to a value that is larger than the third predetermined value $G_{S3}$. In this case, the threshold variation pattern switches at a time from the Hi MAP to the Lo3 MAP, to make the air bag 30 much more likely to be activated, which may result in erroneous deployment of the air bag 36.

In the system of the present embodiment, even when the decelerations $G_{SL}$, $G_{SR}$ determined based on the output signals of the satellite sensors 16, 18 change by a great degree, the threshold variation pattern does not switch at a time from the currently selected one to a desired pattern, but may be changed step by step, as described below with reference to FIGS. 5A, 5B, 6, and 7.

Figure 5:
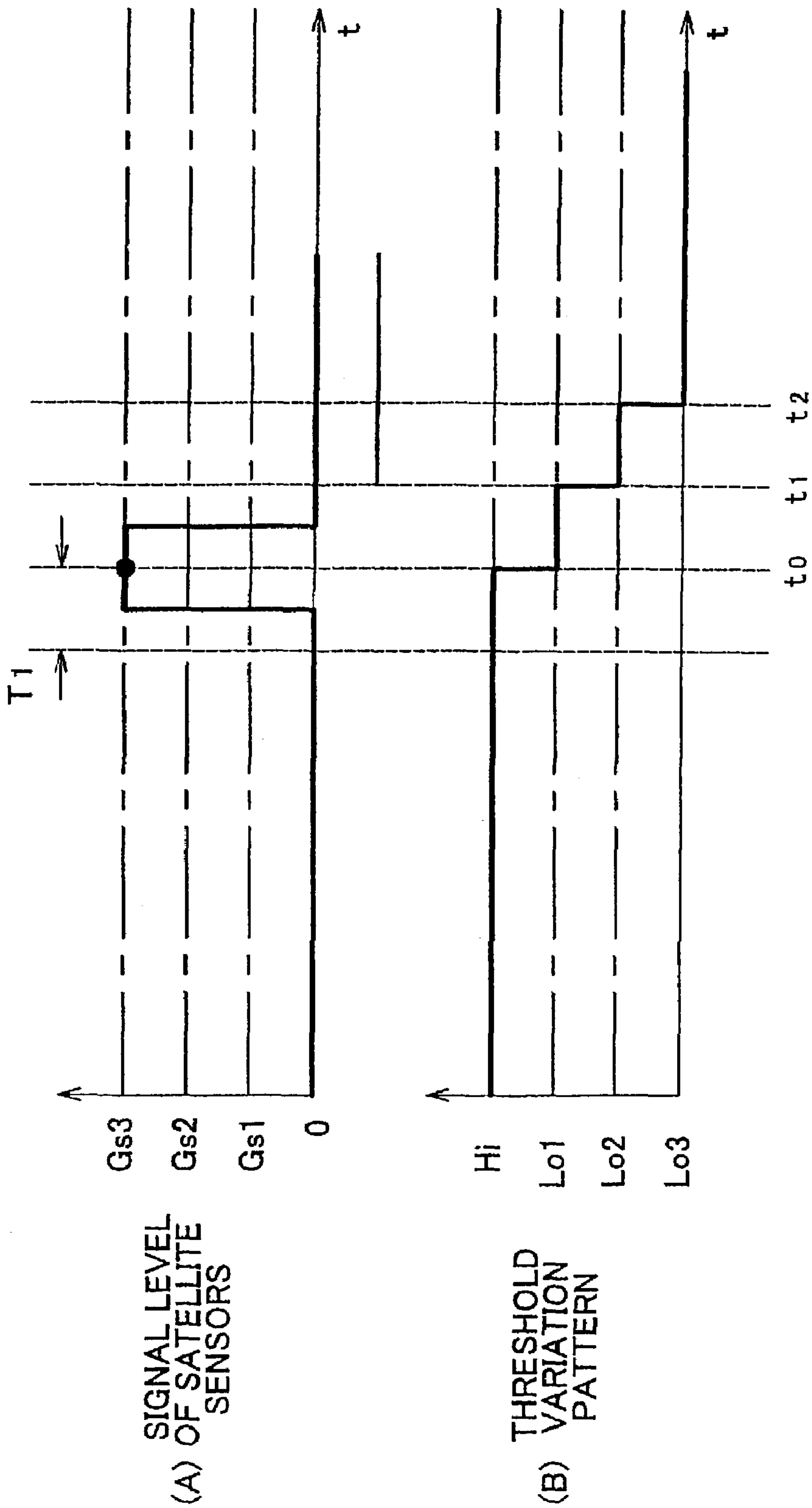
FIG. 5A is a graph indicating changes in a signal level of satellite sensors.
FIG. 5B is a graph useful for explaining the manner of switching the threshold variation pattern according to the preferred embodiment.

Referring to FIG. 5A and FIG. 5B, an operation to switch the threshold variation pattern according to this embodiment will be described. FIG. 5A shows an example of changes with time in the deceleration $G_S$ (i.e., the larger one of the decelerations $G_{SL}$, $G_{SR}$) determined based on the output signals of the satellite sensors 16, 18. FIG. 5B shows an example of changes in the threshold variation pattern with time in the situation as indicated in FIG. 5A In this embodiment, the decelerations $G_{SL}$, $G_{SR}$ are detected at predetermined intervals of sampling time T1 (e.g., 0.5 ms).

As shown in FIG. 5A and FIG. 5B, the deceleration $G_S$ determined based on the output signals of the satellite sensors 16, 18 is smaller than the first predetermined value $G_{S1}$ at a point of time (t0–T1), and therefore the threshold variation pattern is set to the Hi MAP. If the deceleration $G_S$ increases and reaches the third predetermined value $G_{S3}$ at a point of time to in this condition, the threshold variation pattern is initially set to the Lo1 MAP at the point of time t1. The threshold variation pattern then switches from the Lo1 MAP to the Lo2 MAP upon a lapse of the sampling time T1, namely, at a point of time t1 as indicated in FIG. 5B. Subsequently, the threshold variation pattern switches from the Lo2 MAP to the Lo3 MAP upon a lapse of the sampling time T1, namely, at a point of time t2 as indicated in FIG. 5B. In this operation, the threshold variation pattern does not switch at a time from the currently selected one to a desired pattern, but may be changed step by step.

Figure 6:
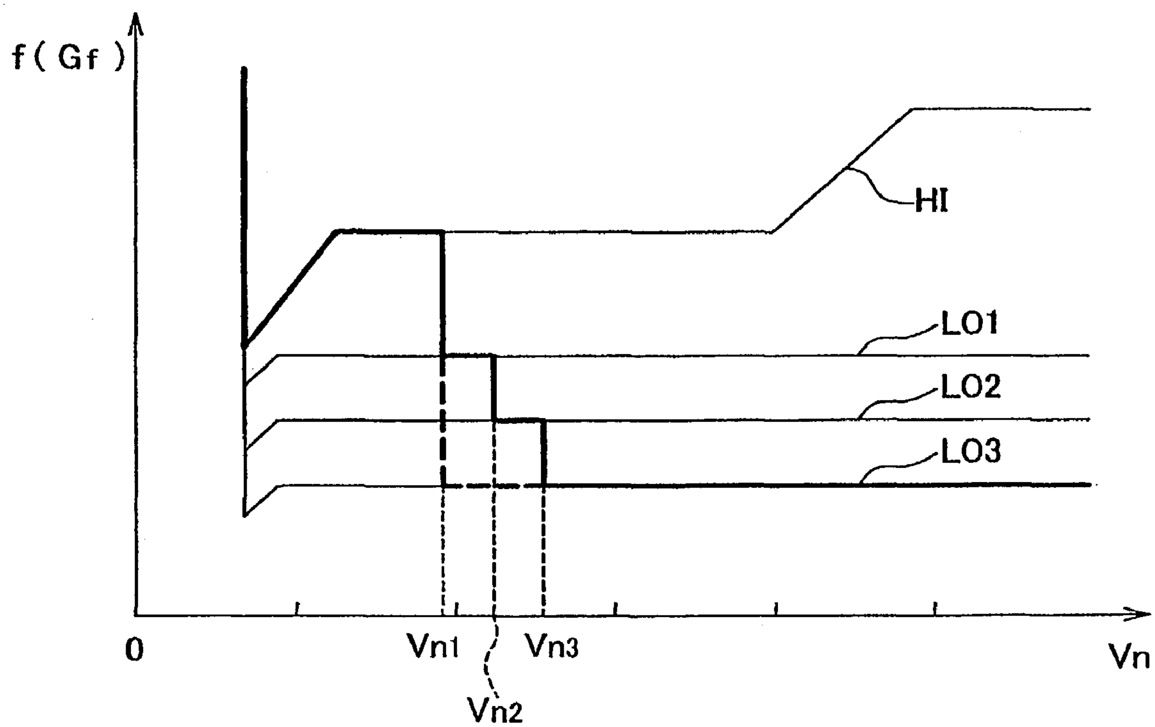
FIG. 6 is a graph representing a situation that is realized when the threshold variation pattern is switched in the manner as shown in FIG. 5B.

FIG. 6 shows changes in the threshold value in relation to the calculated value f(Go) and the velocity Vn, when the threshold variation pattern switches with time in the manner as shown in FIG. 5B. In FIG. 6, switching of the threshold variation pattern (i.e., changes in the threshold value) according to this embodiment of the invention is represented by a thick solid line, and switching of the threshold variation pattern under conventional activation control is represented by a thick broken line.

In the above-mentioned conventional arrangement in which the threshold variation pattern switches to a desired pattern at a time, if the velocity Vn is equal to Vn1 at a point of time when conditions for switching the threshold variation pattern from, for example, the Hi MAP to the Lo3 MAP are established, the threshold variation pattern switches at a time from the Hi MAP to the Lo3 MAP as indicated by the thick broken line. In this arrangement, the threshold value on the Lo3 MAP obtained when the velocity Vn is equal to Vn1 is compared with the calculated value f(Gf), and the comparison between these values is hereinafter made with reference to the Lo3 MAP. As a result, the air bag device 30 is activated when the calculated value f(Gf) corresponding to a certain velocity Vn exceeds the threshold value on the Lo3 MAP which corresponds to the same velocity Vn.

With the arrangement of this embodiment in which the threshold variation pattern switches step by step at predetermined time intervals T1, on the other hand, the threshold variation pattern is initially changed from the Hi MAP only to the Lo1 MAP as indicated by the thick, solid line in FIG. 6. Then, if the velocity Vn is equal to Vn2 when a predetermined time T1 elapses, the threshold variation pattern switches from the Lo1 MAP to the Lo2 MAP. Subsequently, if the velocity Vn is equal to Vn3 upon a lapse of the predetermined time T1, the threshold variation pattern switches from the Lo2 MAP to the Lo3 MAP. In this case, the threshold value on the Lo1 MAP is compared with the calculated value f(Gf) when the velocity Vn is equal to Vn1, and the threshold value on the Lo2 MAP is compared with the calculated value f(Gf) when the velocity Vn is equal to Vn2. When the velocity Vn is equal to Vn3, the threshold value on the Lo3 MAP corresponding to this velocity Vn3 is compared with the calculated value f(Gf) corresponding to the same velocity Vn3.

According to the instant embodiment as described above, even in a situation where the threshold variation pattern changes greatly due to an abnormality in the satellite sensors 16, 18 or an abnormality in communications between the sensors 16, 18 and the ECU 12, the air bag device 30 is prevented from being easily activated, and erroneous deployment of the air bag 36 can be thus avoided. Thus, according to this embodiment, the air bag device 30 can be activated at an appropriate time in an appropriate situation.

Figure 7:
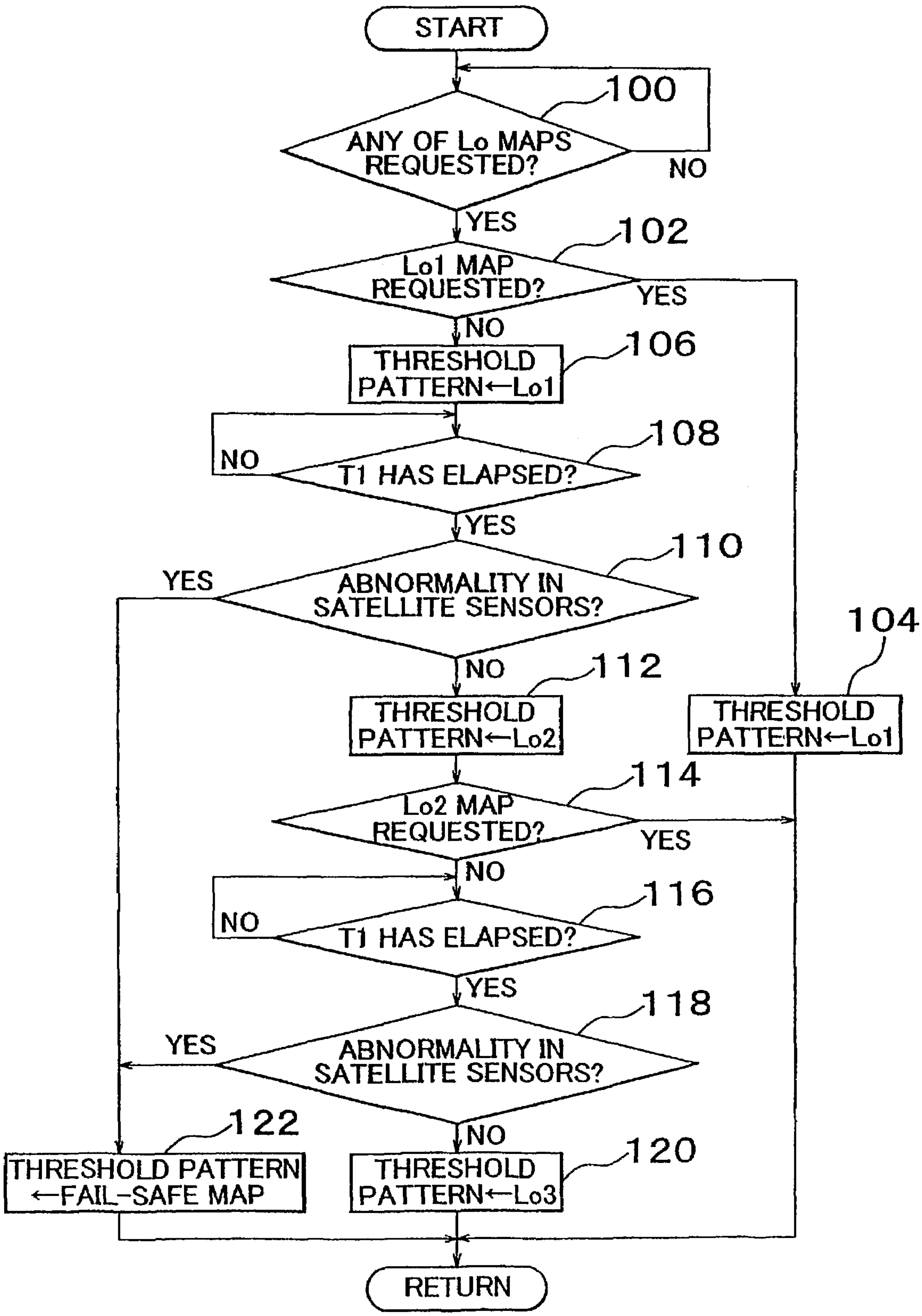
FIG. 7 is a flowchart of an example of a control routine that is executed upon switching of the threshold variation pattern.

FIG. 7 is a flowchart showing an example of a control routine that is executed when the ECU 12 switches the threshold variation pattern according to the present embodiment. The routine as shown in FIG. 7 is started each time one cycle of the routine is finished. Once the routine of FIG. 7 is started, step 100 is first executed.

In step 100, it is determined whether any one of the Lo1 MAP to the Lo3 MAP is being requested as a desired threshold variation pattern, based on the decelerations $G_{SL}$, $G_{SR}$ determined based on the output signals of the satellite sensors 16, 18. Step 100 is repeatedly executed until the above condition is satisfied. If it is determined in step 100 that any one of the Lo1 MAP to the Lo3 MAP is being requested as the desired threshold variation pattern, the control process proceeds to step 102.

In step 102, it is determined whether the Lo1 MAP is requested in the above step 100. If an affirmative decision (YES) is obtained in step 102, the Lo1 MAP to which the threshold variation pattern switches from the Hi MAP only by one step is selected and set as a desired threshold variation pattern. In this case, the control process proceeds to step 104 in which the threshold variation pattern is switched from the Hi MAP to the Lo1 MAP. After execution of step 104, the value determined in relation to the calculated value f(Gf) and the velocity Vn is compared with the threshold value on the Lo1 MAP. Upon completion of the operation of step 104, the current cycle of the routine is terminated.

If a negative decision (NO) is obtained in step 102, on the other hand, the Lo2 MAP or Lo3 MAP to which the threshold variation pattern switches from the Hi MAP while skipping the Lo1 MAP (and the Lo2 MAP) is selected and set as a desired threshold variation pattern. In this case, the control process proceeds to step 106 in which the threshold variation pattern is switched from the Hi MAP to the Lo1 MAP as in the above-indicated step 104. Thereafter, the value determined in relation to the calculated value f(Gf) and the velocity Vn is compared with the threshold value on the Lo1 MAP.

After execution of step 106, step 108 is executed to determine whether a sampling time T1 has elapsed. Step 108 is repeatedly executed until the ECU 12 determines that the sampling time T1 has elapsed. If it is determined that the sampling time T1 has elapsed, the control process proceeds to step 110.

In step 110, it is determined whether there is any abnormality or defect in the satellite sensors 16, 18, based on the results of self diagnosis of the satellite sensors 16, 18. If step 110 determines that there is no abnormality or defect in the satellite sensors 16, 18, the control process proceeds to step 112.

In step 112, the threshold variation pattern is switched from the Lo1 MAP to the Lo2 MAP. After execution of step 112, the value determined in relation to the calculated value f(Gf) and the velocity Vn is compared with the threshold value on the Lo2 map.

In step 114 following step 112, it is determined whether the Lo2 map was requested in the above step 100. If an affirmative decision (YES) is obtained in step 114, no further switching of the threshold variation pattern is required. In this case, therefore, the current cycle of this routine is terminated. If a negative decision (NO) is obtained in step 114, on the other hand, it may be determined that the Lo3 MAP was requested in the above step 100. In this case, therefore, the control process proceeds to step 116.

In step 116 following step 114, it is determined whether the sampling time T1 has elapsed since the operation of step 112 was performed. Step 116 is repeatedly executed until the ECU 12 determines that the sampling time T1 has elapsed. If an affirmative decision (YES) is obtained in step 116, the control process then proceeds to step 118.

In step 118, it is determined whether there is any abnormality or defect in the satellite sensors 16, 18, on the basis of the results of self diagnosis of these sensors 16, 18, in the same manner as in step 110. If it is determined in step 118 that there is no abnormality or defect in the satellite sensors 16, 18, the control process proceeds to step 120.

In step 120, the threshold variation pattern is switched from the Lo2 MAP to the Lo3 MAP. After execution of step 120, the value determined in relation to the calculated value f(Gf) and the velocity Vn is now compared with the threshold value on the Lo3 MAP. Upon completion of the operation of step 120, the current cycle of this routine is terminated.

If it is determined in step 110 or step 118 that there is an abnormality or a defect in the satellite sensors 16, 18, it will not be appropriate to switch the threshold variation pattern to the Lo2 or Lo3 map requested in step 100, but will be appropriate to switch the pattern to a predetermined FAIL-SAFE MAP. In this case, therefore, the control process proceeds to step 122.

In step 112, the threshold variation pattern is switched to the FAIL-SAFE MAP. After execution of step 122, the value determined in relation to the calculated value f(Gf) and the velocity Vn is compared with the threshold value on the FAIL-SAFE MAP. Upon completion of the operation of step 122, the current cycle of this routine is terminated.

According to the process as described above, when the Lo2 MAP or the Lo3 MAP is newly selected while the Hi MAP as a reference map is currently established, and is set as a new threshold variation pattern with the Lo1 MAP (and the Lo2 MAP when the Lo3 is selected) being skipped, switching from the Hi MAP to the Lo2 MAP or Lo3 MAP is effected step by step at predetermined intervals of sampling time T1. Namely, the threshold variation pattern is initially switched from the Hi MAP to the Lo1 MAP, and is then switched to the Lo2 MAP and the Lo3 MAP in this order. In this case, since the threshold variation pattern does not switch to the selected or desired Lo2 MAP or Lo3 MAP at a time, the likelihood that the air bag device 30 will be activated (i.e., the air bag 36 is deployed) can be advantageously reduced. According to the embodiment, therefore, even when there arises an abnormality in the satellite sensors 16, 18, or an abnormality in communications between the satellite sensors 16, 18 and the ECU 12, the air bag 36 is prevented from being deployed by mistake. This arrangement makes it possible to activate the air bag device 30 in an appropriate situation In the control process as described above, if an abnormality in the satellite sensors 16, 18 is detected based on the output signals of the sensors 16, 18 indicating the results of self diagnosis thereof, during the process in which the threshold variation pattern switches from the Hi MAP to the Lo2 MAP or to the Lo3 MAP, the switching operation is terminated, and the threshold variation pattern is set to the FAIL-SAFE MAP. In the present embodiment, therefore, when an abnormality arises in the satellite sensors 16, 18, the threshold value is prevented from being set to an undesirably small value, and the likelihood that the air bag device 30 will be activated can be advantageously reduced. Thus, the air bag device 30 can be activated in an appropriate situation even when an abnormality arises in the satellite sensors 16, 18.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the scope of the invention.

In the illustrated embodiment, when the decelerations $G_{SL}$, $G_{SR}$ determined based on the output signals of the satellite sensors 16, 18 are changed by great degrees, the threshold variation pattern is switched step by step each time the sampling time T1 elapses. The invention, however, is not limited to this arrangement, provided that the threshold variation pattern is switched step by step at predetermined time intervals.

While the FAIL-SAFE MAP to which the threshold variation pattern is set when an abnormality or defect arises in the satellite sensors 16, 18 overlaps the Lo1 MAP in the illustrated embodiment, the FAIL-SAFE MAP may overlap the Lo2 MAP or the Lo3 MAP. Alternatively, the FAIL-SAFE MAP may be an independently prepared map that does not overlap any of the Lo1 MAP, Lo2 MAP and the Lo3 MAP.

In the illustrated embodiment, the threshold variation pattern is set to a selected one of the Hi MAP, the Lo1 MAP, the Lo2 MAP and the Lo3 MAP. The invention, however, is not limited to this arrangement, but may be applied to any arrangement in which the threshold variation pattern is set to a selected one of at least three maps.

Furthermore, in the illustrated embodiment, the threshold variation pattern is switched step by step from the Hi MAP as a reference map to the desired map, e.g., 102 MAP or the Lo3 MAP, without skipping the Lo1 MAP or the Lo2 MAP present between the Hi MAP and the desired map. The invention, however, is not limited to this arrangement. Namely, the invention may be applied to an arrangement in which the threshold variation pattern is switched from the Lo2 MAP or the Lo3 MAP to the Hi MAP.

What is claimed is:

1. An activation control apparatus of an air bag system of a motor vehicle, comprising:
   - a first sensor that is disposed at a predetermined position within a vehicle body, and is operable to generate an output signal indicative of an impact applied to the vehicle;
   - activation control means for activating an air bag device when a parameter determined based on the output signal of the first sensor exceeds a predetermined threshold value;
   - a second sensor that is disposed in the vehicle body frontwardly of the predetermined position of the first sensor, and is operable to generate an output signal indicative of an impact applied to the vehicle;
   - threshold setting means for setting the predetermined threshold value to a first value selected from at least three candidate values, based on the output signal of the second sensor; and
   - threshold switching means for changing the predetermined threshold value from the first value to a second value also selected from the at least three candidate values, by performing two or more switching operations to switch the predetermined threshold value step by step at predetermined time intervals when at least one of the at least three candidate values is present between the first value and the second value.

2. An activation control apparatus according to claim 1, wherein the threshold switching means switches the predetermined threshold value from one of the at least three candidate values to the next lower one thereof in each of the two or more switching operations.

3. An activation control apparatus according to claim 1, wherein the output signal of the second sensor is detected each time a sampling time elapses, and wherein each of the predetermined time intervals is substantially equal to the sampling time.

4. An activation control apparatus according to claim 1, wherein the threshold setting means sets the predetermined threshold value to a predetermined fail-safe value upon occurrence of an abnormality in the air bag system, and threshold switching discontinuing means is provided for discontinuing switching of the predetermined threshold value by the threshold switching means when the threshold setting means sets the predetermined threshold value to the predetermined fail-safe value during the switching operations.

5. An activation control apparatus according to claim 1, wherein the output signal of the second sensor represents a deceleration as measured at a position at which the second sensor is mounted.

6. An activation control apparatus according to claim 1, wherein the output signal of the first sensor represents a deceleration as measured at the predetermined position at which the first sensor is mounted.

7. An activation control apparatus according to claim 6, wherein the parameter represents a time integral of the deceleration determined based on the output signal of the first sensor.

8. An activation control apparatus according to claim 1, wherein the second sensor comprises two satellite sensors that are located in a front right portion and a front left portion of the vehicle.

9. An activation control apparatus of an air bag system of a motor vehicle, comprising:

a first sensor that is disposed at a predetermined position within a vehicle body, and is operable to generate an output signal indicative of an impact applied to the vehicle;

an activation control means for activating an air bag device when a parameter determined based on the output signal of the first sensor exceeds a predetermined threshold pattern;

a second sensor that is disposed in the vehicle body frontwardly of the predetermined position of the first sensor, and is operable to generate an output signal indicative of an impact applied to the vehicle;

threshold pattern setting means for setting the predetermined threshold pattern to a first pattern selected from at least three candidate patterns, based on the output signal of the second sensor; and threshold pattern switching means for changing the predetermined threshold pattern from the first pattern to a second pattern also selected from the at least three candidate patterns, by performing two or more switching operations to switch the predetermined threshold pattern step by step at predetermined time intervals when at least one of the at least three candidate patterns is present between the first pattern and the second pattern.

10. An activation control apparatus according to claim 9, wherein the threshold pattern switching means switches the predetermined threshold pattern from one of the at least three condidate patterns to the next lower one thereof in each of the two or more switching operations.

11. An activation control apparatus according to claim 9, wherein the output signal of the second sensor is detected each time a sampling time elapses, and wherein each of the predetermined time intervals is substantially equal to the sampling time.

12. An activation control apparatus according to claim 9, wherein the threshold pattern setting means sets the predetermined threshold pattern to a predetermined fail-safe patter upon occurrence of an abnormality in the air bag system, and threshold pattern switching discontinuing means is provided for discontinuing switching of the predetermined threshold pattern by the threshold pattern switching means when the threshold pattern setting means sets the predetermined threshold pattern to the predetermined fail-safe pattern during the switching operations.

13. An activation control apparatus according to claim 9, wherein the predetermined fail-safe pattern overlaps at least one of the at least three candidate patterns.

14. An activation control apparatus according to claim 9, wherein the output signal of the second sensor represents a deceleration as measured at a position at which the second sensor is mounted.

15. An activation control apparatus according to claim 9, wherein the output signal of the first sensor represents a deceleration as measured at the predetermined position at which the first sensor is mounted.

16. An activation control apparatus according to claim 15, wherein the parameter represents a time integral of the deceleration determined based on the output signal of the first sensor.

17. An activation control apparatus according to claim 9, wherein the second sensor comprises two satellite sensors that are located in a front right portion and a front left portion of the vehicle.

18. A method of controlling activation of an air bag device in an air bag system of a motor vehicle, the air bag system including a first sensor that is disposed at a predetermined position within a vehicle body, and is operable to generate an output signal indicative of an impact applied to the vehicle, and a second sensor that is disposed in the vehicle body frontwardly of the predetermined position of the first sensor, and is operable to generate an output signal indicative of an impact applied to the vehicle, the method comprising the steps of:

activating the air bag device when a parameter determined based on the output signal of the first sensor exceeds a predetermined threshold value;

setting the predetermined threshold value to a first value selected from at least three candidate values, based on the output signal of the second sensor; and changing the predetermined threshold value from the first value to a second value also selected from the at least three candidate values, by performing two or more switching operations to switch the predetermined threshold value step by step at predetermined time intervals when at least one of the at least three candidate values is present between the first value and the second value.

19. A method according to claim 18, wherein the predetermined threshold value is switched from one of the at least three candidate values to the next lower one thereof in each of the two or more switching operations.

20. A method according to claim 18, wherein the output signal of the second sensor is detected each time a sampling time elapses, and wherein each of the predetermined time intervals is substantially equal to the sampling time.

21. A method according to claim 18, wherein the predetermined threshold value is set to a predetermined fail-safe value upon occurrence of an abnormality in the air bag system, and switching of the predetermined threshold value is discontinued when the predetermined threshold vlaue is set to the predetermined fail-safe value during the switching operations.

22. A method according to claim 18, wherein the output signal of the second sensor represents a deceleration as measured at a position at which the second sensor is mounted.

23. A method according to claim 18, wherein the output signal of the first sensor represents a deceleration as measured at the predetermined position at which the first sensor is mounted.

24. A method according to claim 23, wherein the parameter represents a time integral of the deceleration determined based on the output signal of the first sensor.

25. A method of controlling activation of an air bag device in an air bag system of a motor vehicle, the air bag system including a first sensor that is disposed at a predetermined position within a vehicle body, and is operable to generate an output signal indicative of an impact applied to the vehicle, and a second sensor that is disposed in the vehicle body frontwardly of the predetermined position of the first sensor, and is operable to generate an output signal indicative of an impact applied to the vehicle, the method comprising the steps of:

activating the air bag device when a parameter determined based on the output signal of the first sensor exceeds a predetermined threshold pattern;

setting the predetermined threshold pattern to a first pattern selected from at least three candidate patterns, based on the output signal of the second sensor; and changing the predetermined threshold pattern from the first pattern to a second pattern also selected from the at least three candidate patterns, by performing two or more switching operations to switch the predetermined threshold pattern step by step at predetermined time intervals when at least one of the at least three candidate patterns is present between the first pattern and the second pattern.

26. A method according to claim 25, wherein the predetermined threshold pattern is switched from one of the at least three candidates patterns to the next lower one thereof in each of the two or more switching operations.

27. A method according to claim 25, wherein the output signal of the second sensor is detected each time a sampling time elapses, and wherein each of the predetermined time intervals is substantially equal to the sampling time.

28. A method according to claim 25, wherein the predetermined threshold pattern is set to a predetermined fail-safe pattern upon occurrence of an abnormality in the air bag system, and switching of the predetermined threshold pattern is discontinued when the predetermined threshold pattern is set to the predetermined fail-safe pattern during the switching operations.

29. A method according to claim 25, wherein the predetermined fail-safe pattern overlaps at least one of the at least three candidate patterns.

30. A method according to claim 25, wherein the output signal of the second sensor represents a deceleration as measured at a position at which the second sensor is mounted.

31. A method according to claim 25, wherein the output signal of the first sensor represents a deceleration as measured at the predetermined position at which the first sensor is mounted.

32. A method according to claim 31, wherein the parameter represents a tune integral of the decelaration determined based on the output signal of the first sensor.

* * * * *

UNITED STATES PATENT AND TRADEMARK OFFICE

CERTIFICATE OF CORRECTION

PATENT NO. : 7,002,262 B2
APPLICATION NO. : 10/332,856
DATED : February 21, 2006
INVENTOR(S) : Miyata et al.

It is certified that error appears in the above-identified patent and that said Letters Patent is hereby corrected as shown below:

| Column | Line | |
|---|---|---|
| 12 | 1 | Change "condidate" to --candidate--. |
| 13 | 8 | Change “vlave” to --vlaue--. |
| 14 | 36 | Change “decelaration” to --deceleration--. |

Signed and Sealed this

Eighth Day of August, 2006

JON W. DUDAS
*Director of the United States Patent and Trademark Office*